United States Patent
Chory et al.

(10) Patent No.: US 8,065,600 B2
(45) Date of Patent: Nov. 22, 2011

(54) SYSTEMS AND METHODS FOR DEFINING WEB CONTENT NAVIGATION

(75) Inventors: Susan Chory, Seattle, WA (US); Matthew E. Gibbs, Redmond, WA (US); Scott D. Guthrie, Bellevue, WA (US); Michael Harder, Bellevue, WA (US); Robert M. Howard, Frisco, TX (US); Scott Kirk Imig, Redmond, WA (US); Nikhil Kothari, Sammamish, WA (US); Shanku Shivabrata Niyogi, Bellevue, WA (US); Ting-Hao Yang, Kirkland, WA (US); Andres M. Sanabria, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 808 days.

(21) Appl. No.: 10/846,496

(22) Filed: May 14, 2004

(65) Prior Publication Data

US 2005/0257138 A1 Nov. 17, 2005

(51) Int. Cl.
*G06F 17/00* (2006.01)
*G06F 17/20* (2006.01)

(52) U.S. Cl. ......... 715/205; 715/234; 715/760; 715/818

(58) Field of Classification Search .................. 715/513, 715/501.1, 517, 718, 719, 720, 721, 722, 715/723, 727, 728, 733, 734, 735, 736, 738, 715/748, 752, 753, 756, 758, 764, 978, 744, 715/745, 788, 818–820, 205, 206, 234, 243
See application file for complete search history.

(56) References Cited

U.S. PATENT DOCUMENTS

| | | | |
|---|---|---|---|
| 3,937,925 | A | 2/1976 | Boothroyd |
| 3,956,615 | A | 5/1976 | Anderson et al. |
| 4,186,871 | A | 2/1980 | Anderson et al. |
| 4,807,154 | A | 2/1989 | Scully et al. |
| 4,847,785 | A | 7/1989 | Stephens |
| 4,949,300 | A | 8/1990 | Christenson et al. |
| 4,979,148 | A | 12/1990 | Bush et al. |
| 5,299,315 | A | 3/1994 | Chin et al. |
| 5,349,657 | A | 9/1994 | Lee |
| 5,388,156 | A | 2/1995 | Blackledge, Jr. et al. |
| 5,465,332 | A | 11/1995 | Deloye et al. |

(Continued)

FOREIGN PATENT DOCUMENTS

EP 1156415 11/2001

(Continued)

OTHER PUBLICATIONS

"A Brief History of Hypertext", from Microsoft Corporation © 1996.

(Continued)

*Primary Examiner* — Nicholas Augustine
(74) *Attorney, Agent, or Firm* — Merchant & Gould, P.C.

(57) ABSTRACT

The described systems and methods are directed at defining web content navigation. The disclosed technique enables the development of web content for a scenario without having to create every navigational control that is needed to manage the flow through the web content in the scenario or to write non-declarative server-side logic to control navigation. This method determines a declaration in a source file for a web page. The declaration is associated with an object. The method determines the views associated with the object where each of the views includes a user-interface. A flow for navigating through the views is determined. The views are rendered in accordance with the navigational flow.

35 Claims, 7 Drawing Sheets

U.S. PATENT DOCUMENTS

| | | | |
|---|---|---|---|
| 5,471,318 A * | 11/1995 | Ahuja et al. | 358/400 |
| 5,517,655 A | 5/1996 | Collins et al. | |
| 5,548,340 A | 8/1996 | Bertram | |
| 5,550,560 A | 8/1996 | Kanada et al. | |
| 5,604,908 A | 2/1997 | Mortson | |
| 5,638,176 A | 6/1997 | Hobbs et al. | |
| 5,640,449 A | 6/1997 | Worley et al. | |
| 5,664,228 A | 9/1997 | Mital | |
| 5,675,520 A | 10/1997 | Pitt, III et al. | |
| 5,706,505 A | 1/1998 | Fraley et al. | |
| 5,732,256 A | 3/1998 | Smith | |
| 5,732,267 A | 3/1998 | Smith | |
| 5,745,103 A | 4/1998 | Smith | |
| 5,748,890 A | 5/1998 | Goldberg et al. | |
| 5,764,873 A * | 6/1998 | Magid et al. | 715/769 |
| 5,774,670 A | 6/1998 | Montulli | |
| 5,793,982 A | 8/1998 | Shrader et al. | |
| 5,812,996 A | 9/1998 | Rubin et al. | |
| 5,835,724 A | 11/1998 | Smith | |
| 5,855,020 A | 12/1998 | Kirsch | |
| 5,878,141 A | 3/1999 | Daly et al. | |
| 5,878,282 A | 3/1999 | Mital | |
| 5,897,622 A | 4/1999 | Blinn et al. | |
| 5,911,068 A | 6/1999 | Zimmerman et al. | |
| 5,918,007 A | 6/1999 | Blackledge, Jr. et al. | |
| 5,940,075 A | 8/1999 | Mutschler, III et al. | |
| 5,940,847 A | 8/1999 | Fein et al. | |
| 5,953,524 A | 9/1999 | Meng et al. | |
| 5,956,489 A | 9/1999 | San Andres et al. | |
| 5,961,601 A | 10/1999 | Iyengar | |
| 5,963,952 A | 10/1999 | Smith | |
| 5,983,227 A | 11/1999 | Nazem et al. | |
| 5,991,802 A | 11/1999 | Allard et al. | |
| 6,006,230 A | 12/1999 | Ludwig et al. | |
| 6,014,637 A | 1/2000 | Fell et al. | |
| 6,014,666 A | 1/2000 | Helland et al. | |
| 6,032,207 A | 2/2000 | Wilson | |
| 6,038,551 A | 3/2000 | Barlow et al. | |
| 6,067,578 A | 5/2000 | Zimmerman et al. | |
| 6,072,664 A | 6/2000 | Aoyagi et al. | |
| 6,076,108 A | 6/2000 | Courts et al. | |
| 6,101,607 A | 8/2000 | Bachand et al. | |
| 6,108,717 A | 8/2000 | Kimura et al. | |
| 6,115,744 A | 9/2000 | Robins | |
| 6,121,968 A | 9/2000 | Arcuri et al. | |
| 6,138,150 A | 10/2000 | Nichols et al. | |
| 6,167,524 A | 12/2000 | Goodnow et al. | |
| 6,178,461 B1 | 1/2001 | Chan et al. | |
| 6,185,608 B1 | 2/2001 | Hon et al. | |
| 6,203,220 B1 | 3/2001 | Takenoshita et al. | |
| 6,205,480 B1 | 3/2001 | Broadhurst et al. | |
| 6,212,192 B1 | 4/2001 | Mirashrafi et al. | |
| 6,218,958 B1 | 4/2001 | Eichstaedt et al. | |
| 6,230,160 B1 | 5/2001 | Chan et al. | |
| 6,246,422 B1 | 6/2001 | Emberling et al. | |
| 6,247,044 B1 | 6/2001 | Gosling et al. | |
| 6,253,228 B1 | 6/2001 | Ferris et al. | |
| 6,253,234 B1 | 6/2001 | Hunt et al. | |
| 6,279,151 B1 | 8/2001 | Breslau et al. | |
| 6,286,133 B1 | 9/2001 | Hopkins | |
| 6,297,819 B1 * | 10/2001 | Furst | 715/733 |
| 6,326,957 B1 | 12/2001 | Nathan et al. | |
| 6,334,157 B1 | 12/2001 | Oppermann et al. | |
| 6,343,148 B2 | 1/2002 | Nagy | |
| 6,351,767 B1 | 2/2002 | Batchelder et al. | |
| 6,353,447 B1 | 3/2002 | Truluck et al. | |
| 6,354,477 B1 | 3/2002 | Trummer | |
| 6,363,352 B1 | 3/2002 | Dailey et al. | |
| 6,370,561 B1 | 4/2002 | Allard et al. | |
| 6,373,841 B1 | 4/2002 | Goh et al. | |
| 6,397,253 B1 | 5/2002 | Quinlan et al. | |
| 6,401,099 B1 | 6/2002 | Koppolu et al. | |
| 6,405,241 B2 | 6/2002 | Gosling et al. | |
| 6,412,008 B1 | 6/2002 | Fields et al. | |
| 6,430,575 B1 | 8/2002 | Dourish et al. | |
| 6,460,071 B1 | 10/2002 | Hoffman | |
| 6,460,141 B1 | 10/2002 | Olden | |
| 6,463,442 B1 | 10/2002 | Bent et al. | |
| 6,480,894 B1 | 11/2002 | Courts et al. | |
| 6,487,665 B1 | 11/2002 | Andrews et al. | |
| 6,505,238 B1 | 1/2003 | Tran | |
| 6,539,421 B1 * | 3/2003 | Appelman et al. | 709/206 |
| 6,546,516 B1 | 4/2003 | Wright et al. | |
| 6,557,038 B1 | 4/2003 | Becker et al. | |
| 6,560,598 B2 | 5/2003 | Delo et al. | |
| 6,560,618 B1 | 5/2003 | Ims | |
| 6,564,251 B2 | 5/2003 | Katariya et al. | |
| 6,591,272 B1 | 7/2003 | Williams | |
| 6,606,418 B2 | 8/2003 | Mitchell et al. | |
| 6,622,168 B1 | 9/2003 | Datta | |
| 6,633,416 B1 | 10/2003 | Benson | |
| 6,725,219 B2 | 4/2004 | Nelson et al. | |
| 6,728,421 B2 | 4/2004 | Kokemohr | |
| 6,789,105 B2 * | 9/2004 | Ludwig et al. | 709/204 |
| 2001/0054020 A1 | 12/2001 | Barth et al. | |
| 2002/0004815 A1 | 1/2002 | Muhlestein et al. | |
| 2002/0008703 A1 | 1/2002 | Merrill et al. | |
| 2002/0083171 A1 | 6/2002 | Hoogenboom et al. | |
| 2002/0108102 A1 | 8/2002 | Muhlestein et al. | |
| 2002/0188890 A1 | 12/2002 | Shupps et al. | |
| 2003/0009476 A1 | 1/2003 | Fomenko et al. | |
| 2003/0009519 A1 | 1/2003 | Gosling et al. | |
| 2003/0009567 A1 | 1/2003 | Farouk | |
| 2003/0018827 A1 | 1/2003 | Guthrie et al. | |
| 2003/0025728 A1 | 2/2003 | Ebbo et al. | |
| 2003/0028565 A1 | 2/2003 | Landsman et al. | |
| 2003/0028892 A1 * | 2/2003 | Gewickey et al. | 725/110 |
| 2003/0074634 A1 | 4/2003 | Emmelmann | |
| 2003/0097639 A1 | 5/2003 | Niyogi et al. | |
| 2004/0003112 A1 | 1/2004 | Alles et al. | |
| 2004/0003139 A1 | 1/2004 | Cottrille et al. | |
| 2004/0003248 A1 | 1/2004 | Arkhipov | |
| 2004/0073873 A1 | 4/2004 | Croney et al. | |
| 2004/0218045 A1 * | 11/2004 | Bodnar et al. | 348/207.1 |
| 2005/0138560 A1 * | 6/2005 | Lee et al. | 715/719 |
| 2005/0166230 A1 * | 7/2005 | Gaydou et al. | 725/41 |
| 2006/0112336 A1 * | 5/2006 | Gewickey et al. | 715/716 |
| 2007/0005795 A1 * | 1/2007 | Gonzalez | 709/232 |
| 2007/0033533 A1 * | 2/2007 | Sull | 715/752 |

FOREIGN PATENT DOCUMENTS

| | | |
|---|---|---|
| EP | 1156427 | 11/2001 |
| EP | 1156428 | 11/2001 |
| EP | 1164473 | 12/2001 |
| EP | 01111680.3-2201 | 4/2002 |
| EP | 01111681.1-2201 | 4/2002 |
| WO | WO 98/21651 | 5/1998 |
| WO | WO 98/44695 | 10/1998 |
| WO | WO 99/34288 | 7/1999 |

OTHER PUBLICATIONS

"Alterego Networks Introduces First Mobile Web Server for Enterprises, Telcos and Providers"; Redwood City, CA; Nov. 14, 2000; 3 pages.

"Best Practices for Creating Adaptive User Interfaces with the Mobile Internet Toolkit"; Microsoft Corporation, Jan. 2002; 15 pages.

"Best Practices for the Microsoft Mobile Internet Toolkit Image Control"; Microsoft Corporation, Feb. 2002.

"Bluestone Software Layes Foundation for Internet Operating Environment with Total-E-Server . . . " Screaming Media, Business Wire; Jun. 5, 2000; 3 pages.

"Developing ASP-Based Applications" from Microsoft Corporation © 1996.

"HTML Encyclopaedia"; http://www.scit.wlv.ac.uk/encyc/form.html; 2 pages.

"HTTP Made Really Easy—A Practical Guide to Writing Clients and Servers", by Marshall, Aug. 15, 1997.

Anderson, Richard; Homer, Alex; Howard, Rob; Sussman, Dave; "A Preview of Activer Server Pages+"; Copyright 2000, Wrox Press, pp. 1-73.

Article, ColdFusion Web Application Server, update and summary, from Allaire Corp—www@allaire.com.

Chapter 3, "Mechanics of Developing JavaScript Applications," Server-Side Javascript Guide, 'Online! 1999, pp. 51-108, www.Developer.netscape.com/docs/manuals, ssjs/1_4/ssjs.pdf>.

Chapter 6, "Session Management Service," Server-Side Javascript Guide, 'Online! 1999, pp. 125-166, www.developer.netscape.com/docs/manuals/ssjs/1_4/ssjs.pdf>.

Custer, Helen; "Inside Windows NT"; Microsoft Press 1993; pp. 74-81.

Davulcu, Hasan; Freire, Juliana; Kifer, Michael; Ramakrishnan, I.V.; "A Layered Architecture for Querying Dynamic Web Content"; ACM 1999; pp. 491-502.

Dobson, R., "Data Binding in Dynamic HTML," DBMS MAG, 'Online! Mar. 1998 pp. 47-52.

Dowd, Tyson et al., "Compiling Mercury to the .NET Common Language Runtime," Electronic Notes in Theoretical Computer Sciences 59 No. 1 (Netherlands) (2001), pp. 1-16.

Duan, Nick N.; "Distributed Database Access in a Corporate Environment Using Java" Bell Atlantic Corporation; 1996; 8 pages.

Esposito, Dino, "Heaven sent," Developer Network Journal, Mar.-Apr. 2001, Matt Publishing, UK, No. 23, pp. 18-24.

Franklin, K., "Supercharge Data Binding," Visual Basic Programmer's Journal, Mar. 2000, Fawcette Technical Publications, vol. 10, No. 3, pp. 32-33, 39-40, 42, 44, 46.

Frost, Jim: "Windows NT Security"; May 4, 1995; 7 pages; http://world.std.com/~jimf/papers/nt-security/nt-security.html.

Hammock swings through Web Interfaces (3 pages) by Eric Hammond.

Hammock(TM), Think of it as Swing(TM) for the Web (10 pages).

Hannay, Phillip et al., "MSIL For the .NET Framework: The Next Battleground?", Virus Bulletin Conference, Sep. 2001, pp. 173-196.

Holmes, John W.; e-Mail response to question regarding GET/POST. HTTP request, extracted from GOOGLE's News Groups, php.general, Nov. 11, 2002.

Hovanes, Michael E.; Deal, John R. Grier; Rowberg, Alan H.; "Seamless Multiresolution Display of Portable Wavelet-Compressed Images" Journal of Digital Imaging, vol. 12, No. 2 suppl 1 May 1999, pp. 109-111.

Ingham, David B.; "W3Objects: A Distributed Object-Oriented Web Server" Object-Oriented Web Servers and data Modeling Workshop, Sixth International World Wide Web Conference, Apr. 7, 1997, Santa Clara, CA 4 pages.

Kitayama, Fumihiko; Hirose, Shin-Ichi; Kondoh, Goh; Kuse, Kazushi; "Design of a Framework for Dynamic Content Adaptation to Web-Enabled Terminals and Enterprise Applications"; IEEE 1999, pp. 72-79.

Kunz, T.; El Shentenawy, M.; Gaddah, A..; Hafez, R.; Image Transcoding for Wireless WWW Access: The User Perspective; Multimedia Computing and Networking 2002, Proceedings of SPIE vol. 467 (2002) pp. 28-33.

Langheinrich, M., et al., "Unintrusive customization techniques for Web advertising," Computer Networks, vol. 31, No. 11-16. May 17, 1999, pp. 1259-1272.

Lee, C.-H., et al., "Web personalization expert with combining collaborative filtering and association rule mining technique," Expert Systems With Applications, Vo. 21, No. 3, Oct. 2001, pp. 131-137.

Li, W.-S., et al., "PowerBookmarks: a system for personalizable Web information organization, sharing, and management," Computer Networks, vol. 31, No. 11-16, May 17, 1999, pp. 1375-1389.

Mobasher, B., "A Web personalization Engine Based on User Transaction Clustering," Proc. Of the 9th Annual Workshop on Information Tech. And Systems, Dec. 11, 1999, pp. 179-184.

Nadamoto, Akiyo; Kondo, Hiroyuki; Tanaka, Katsumi; "WebCarousel: Restructuring Web Search Results for Passive Viewing in Mobile Environments" IEEE 2001 p. 164-165.

"NCSA httpd" nttpd@ncsa.uiuc.edu.

O'Leary, M., "Web personalization Does It Your Way," O'Leary Online, vol. 23, No. 2, Mar.-Apr. 1999, pp. 79-80.

OOP Launches Hammock at JavaOne (1 page).

Penn, Gerald; Hu Jianying; Luo, Hengbin; McDonald, Ryan; "Flexible Web Document Analysis for Deliver to Narrow-Bandwidth Devices"; IEEE 2001; pp. 1074-1078.

Pyarali, Van; O'Ryan, Carlos; Schmidt, Douglas; Wang, Nanbor; Gokhale, Aniruddha S.; Kachroo, Vishal; "Using Priciple Patterns to Optimize Real-Time ORB's" IEEE Concurrency, 2000, pp. 16-25.

Ramakrishnan, N., "PIPE: Web Personalization by Partial Evaluation," IEEE Internet Computing, vol. 4, No. 6, Nov.-Dec. 2000, pp. 21-31.

Seddon, Bill, "Generating XP Style webparts from a web control," The Code Project—Generating XP style webparts from a web control—ASP.NET, online at http://www.codeproject.com/aspnet/webpartscontrol.asp, retrieved Apr. 8, 2004, 10 pages.

Sells, Chris et al., "Generating Code at Run Time with Reflection.Emit," Windows Developer Magazine, Aug. 2002, vol. 13, No. 8, pp. 26-34.

Shapiro, M., "A Binding Protocol for Distributed Shared Objects," Proceedings of the International Conference on Distributed Computing Systems, Poznan, Poland, Jun. 21-24, 1994, Los Alamitos, IEEE Comp. Soc. Press.

Shi, Weisong; Collins, Eli; Karamcheti, Vijay; "Modeling Object Characteristics of Dynamic Web Content"; Proceedings of the IEEE Global Internet Conference, Nov. 2002, 5 pgs.

Solomon, David A. "Inside Windows NT, Second Edition"; Microsoft Press 1998; pp. 310-319.

Stewart, Tony: "The Document as Application: Issues and Implications" GCA XML Europe 1999; pp. 575-599.

Syme, Don, "ILX: Extending the .NET Common IL for Functional Language Interoperability," Electronic Notes in Theoretical Computer Science 59 No. 1 (2001), pp. 1-20.

Varela, Carlos A.; Caroline C. Hayes; "Providing Data on the Web: From Examples to Programs," Second International WWW Conference, Chicago, IL; Oct. 17, 1994; 17 pages.

Wu, Dapeng; Hou, Yiwci Thomas-Zhang, Ya-Qin; "Scalable Video Transport over Wireless IP Networks"; IEEE 2000; pp. 1185-1191.

* cited by examiner

SYSTEMS AND METHODS FOR DEFINING WEB CONTENT NAVIGATION

TECHNICAL FIELD

The systems and methods discussed herein relate to web page navigation.

BACKGROUND OF THE INVENTION

Pages in the World Wide Web (Web) are typically written in hyper text markup language (HTML). Server-side logic controlling navigation and performing data access and other server-side functionality is typically written in a procedural or object-oriented programming language to tie pages together, forming a web application. These web pages are stored on servers connected through the Internet. Each web page is associated with a uniform resource locator (URL) and a user/client can browse to a particular web page by requesting the web page from a server using the URL corresponding to the web page.

Web applications are increasingly being used to interact with users in a web-based environment. These web applications may include many different types of scenarios, such as login and logout operations, e-commerce, help wizards, and the like. To interact with users for a particular scenario, a web application typically has to include multiple web pages to present information to and receive input from the users. Web developers typically have to carefully design web pages and server-side procedural logic for a web application to manage the navigation of the pages through a scenario. Specifically, a web developer must incorporate multiple navigational controls in each web page and add server-side procedural logic to ensure that the navigational controls in all of the web pages allow a user to correctly navigate through the scenario. If web pages with dynamic content are used, the developer must also include server-side logic to accurately track and respond to the user-driven navigation flow through these dynamically changing pages. Web pages developed in this labor-intensive manner are expensive and error prone.

Thus, there is a need for an efficient web development technique for defining navigational flow in a scenario without the need to write procedural server-side navigational logic in each web page and to track the navigation flow through the web pages.

SUMMARY OF THE INVENTION

The systems and methods described herein are directed at defining web content navigation by declaring multiview objects. The disclosed technique enables the development of web content for a scenario without having to write server-side navigational logic to manage the flow through the web content in the scenario.

In one aspect, a method determines a declaration in a web page. The declaration is associated with an object. The method determines the views associated with the object where each of the views includes a user-interface. A flow for navigating through the views is determined. The views are rendered in accordance with the navigational flow.

DETAILED DESCRIPTION

Figure 1:
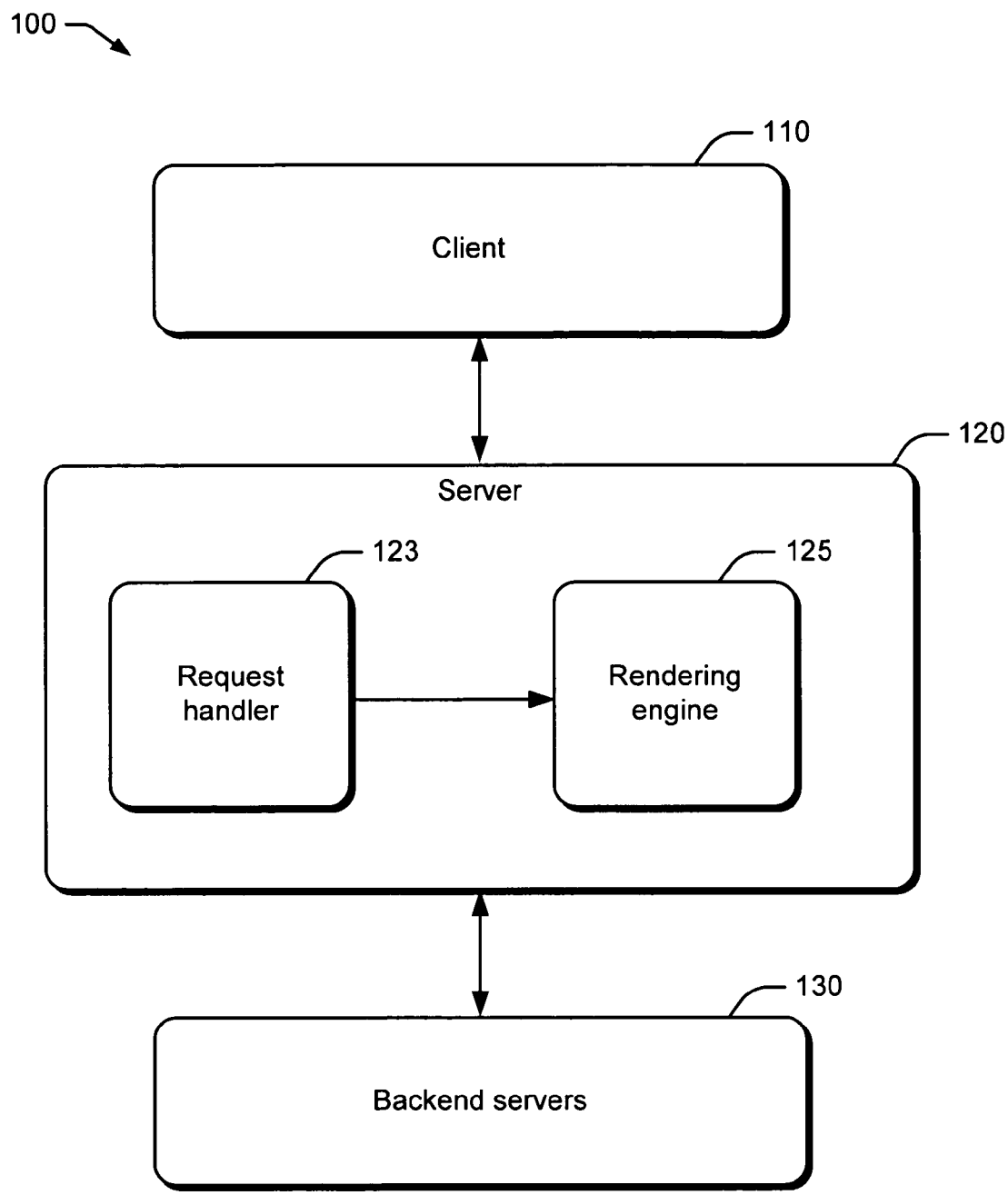
FIG. 1 is a schematic diagram of a system for declarative scenario based navigation.

FIG. 1 is a schematic diagram of a system 100 for declarative scenario based navigation. System 100 includes client 110 and server 120. Client 110 and server 120 may include any type of computing device. Client 110 is configured to enable users to request web pages. For example, client 110 is configured to send a request for a web page to server 120 and to render the web page for the users using data received from server 120. The data sent from server 120 to client 110 may include information for rendering a view associated with a web application on server 120. A view is a web-based user-interface that enables a user to interact with a web application. Client 110 is configured to present views to the user and to send inputs from the user to server 120.

Server 120 is configured to provide web content to client 110. As shown in FIG. 1, server 120 includes request handler 123 and rendering engine 125. Both of these components will be discussed in detail in conjunction with FIG. 2. Briefly stated, request handler 123 is configured to process a request for a web page by locating and retrieving a source file associated with the request. The source file may include declarations for one or more objects. The declarations may specify the properties, states, options, and other information related to the objects. Rendering engine 125 is configured to generate web content based on the object-oriented source file. Particularly, rendering engine 125 is configured to obtain programmatic access to objects associated with the declarations in the source file. These objects are used to generate views and may include both data and procedures for manipulating the data.

Server 120 may also be configured to interact with other computing devices, such as backend servers 130. Backend servers 130 may be configured to provide a variety of services to server 120, such as e-commerce services, user authentication services, emailing services, phone and paging services, and the like. Server 120 may subscribe to the services provided by backend servers 130 to implement the object-oriented source file determined by request handler 123.

Server 120 may communicate with backend servers 130 and client 110 through any type of network, such as wide area network (WAN), local area network (LAN), wireless network, the Internet, and the like.

Figure 2:
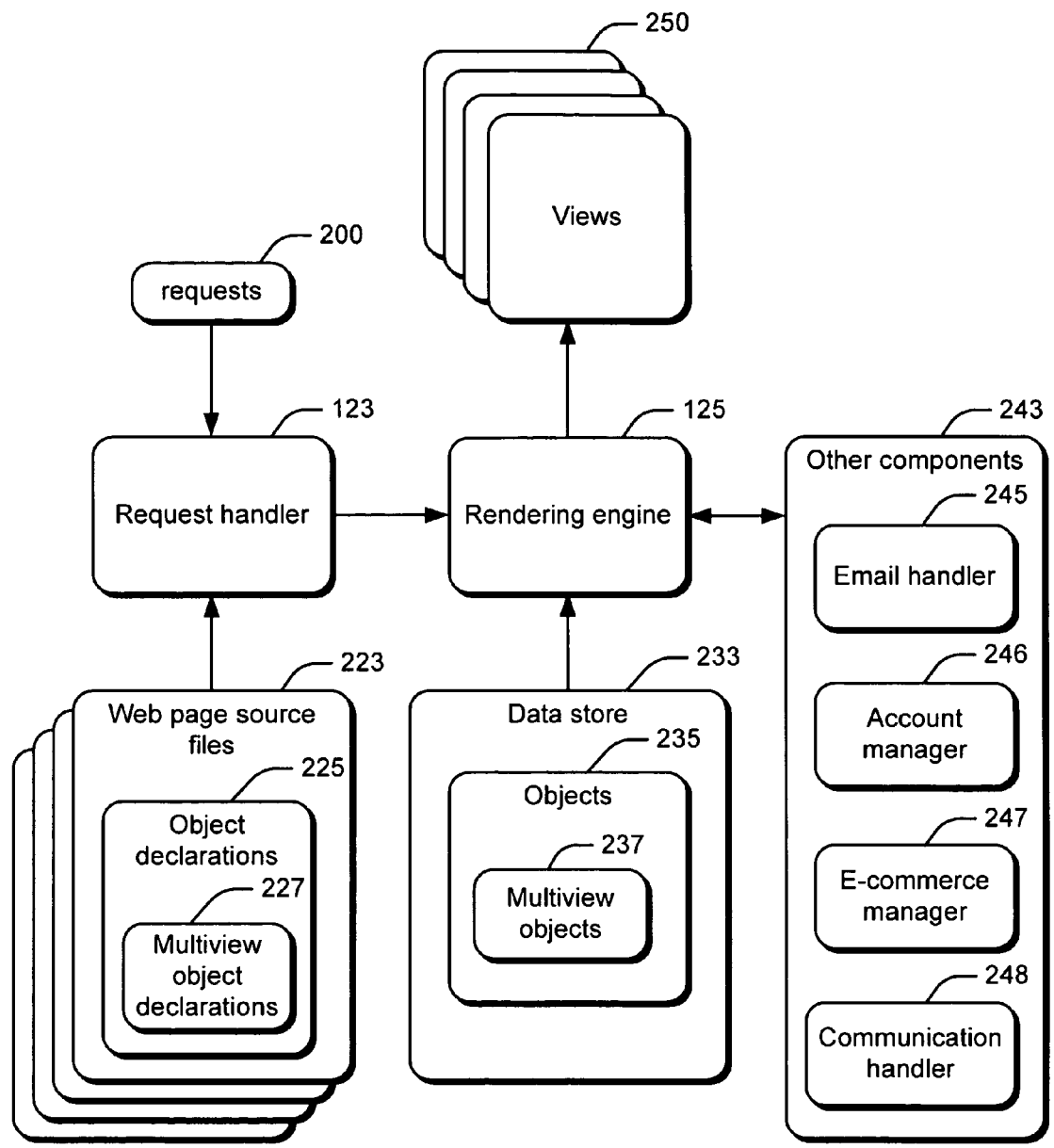
FIG. 2 is a schematic diagram of the components associated with the request handler and the rendering engine shown in FIG. 1.

FIG. 2 is a schematic diagram of the components associated with the request handler 123 and the rendering engine 125 shown in FIG. 1. Request handler 123 is configured to receive requests 200 for web pages. Requests 200 may include any type of information associated with the request web pages, such as an address, a uniform resource locator (URL), and user input.

Request handler 123 is configured to access source files 223. Each of the source files 223 includes program code and is associated with a web page, which may be identified by an address. Request handler 123 is configured to determine a source file corresponding to the address in a request. Each of the source files 223 includes object declarations 225, which are declarations for objects 235 used for generating views associated with the requested web page. Object declarations 225 are typically included in a source file as mark-up tags. Each tag may include an identifier associated with an object and other information related to the object, such as properties, states, and options.

Rendering engine 125 is configured to process source files 223 and to generate views 250 from the codes. To generate views 250, rendering engine 125 determines object declarations 225 in source files 223 and gains access to objects 235 associated with object declarations 225. Rendering engine 125 uses the data and procedures associated with objects 235 for rendering views 250. In addition to rendering views 250, rendering engine 125 may also perform other operations associated with objects 235, such as sending an email, authenticating a user, setting up a user account, handling a business transaction, making a phone call or a page, and the like. To perform these operations, rendering engine 125 may interact with other components, such as email handler 245, account manager 246, e-commerce manager 247, communication handler 248, and the like. Components 245-248 may be executing on server 120 shown in FIG. 1 or other servers such as backend server 130.

As illustrated in FIG. 2, web page source files 223 may include multiview object declarations 227, which are declarations for multiview objects 237. Multiview objects 237 will be discussed in more detail in conjunction with FIG. 3. Briefly stated, a multiview object is an object that is configured to enable a server to generate multiple views. A multiview object may include other objects, logic, and data for the server to render the views to a client. A multiview object may be associated with a scenario, such as a login scenario, a logout scenario, a password recovery scenario, an e-commerce scenario, a wizard scenario, a change password scenario, a create user scenario, and the like. A web developer of a web page may implement multiple views for a scenario by including a declaration for the multiview object associated with that scenario in the source file for the web page.

It is to be understood that the use of multiview objects enables a web developer to implement multiple views associated with a scenario without having to incorporate controls in each of the views or to dynamically manage navigational flow through the views. Multiview object may also encapsulate other operations and data associated with a scenario so that the web developer may incorporate an entire scenario package into a web application with a single declaration in a source file. The web developer may specify properties, states, and options to tailor the multiview object for producing the desired scenario.

Figure 3:
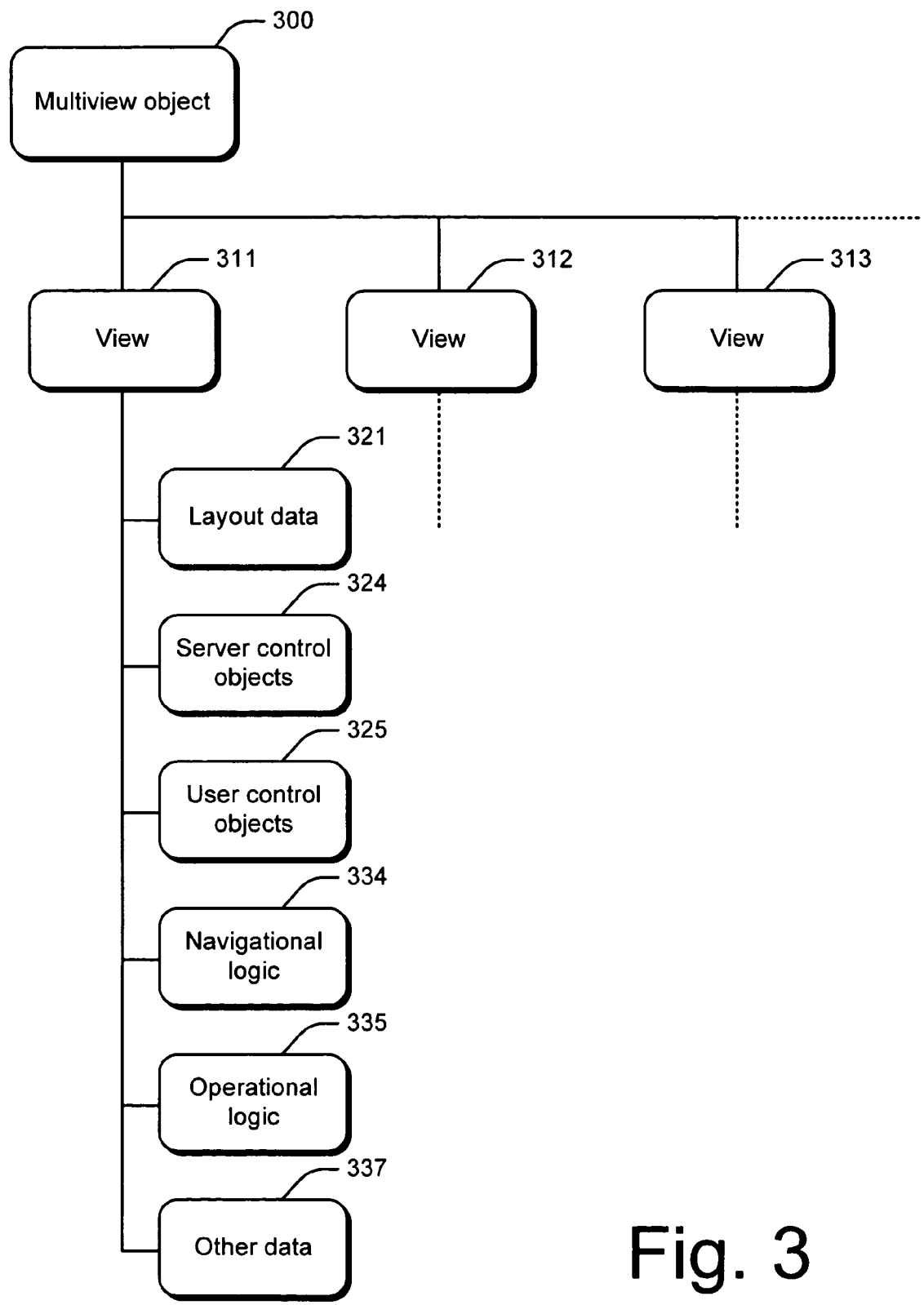
FIG. 3 is a schematic diagram of a data structure for a multiview object.

FIG. 3 is a schematic diagram of a data structure for a multiview object 300. As shown in FIG. 3, multiview object 300 may include multiple views, such as views 311-313. Each of the views 311-313 may include objects, logic and data for implementing that view and performing operations associated with the view. For example, view 311 includes layout data 321, server control objects 324, user control objects 325, navigational logic 334, operational logic 335, and other data 337.

Server control objects 324 define logical controls for implementing operations that are executed by the server. For example, multiview object 300 is a type of server control object. Server control objects 324 may include data and procedures for the server to execute any type of operation. The operations associated with server control objects 324 may be related to rendering view 311 or performing actions in connection with view 311.

User control objects 325 define logical controls for users that may be included in view 311. User control objects 325 may include data and procedures for implementing any type of user logical control, such as a button, a textbox, a pull-down menu, a selectable area, and the like.

Layout data 321 includes the framework for organizing the elements in view 311. For example, layout data 321 may define where to place the logical controls defined by user control objects 325 in view 311. Layout data 321 may also include text, multimedia items, and other content for including in view 311. Layout data 321 may be supplied by the view rendering server that handles multiview object 300 or other servers that are in communication with the view rendering server. These other servers may be configured to supply specialized data, such as stock quotes, maps, weather information, and the like.

Navigational logic 334 includes data and procedures for navigating among views associated with multiview object 300. Navigational logic 334 may be implemented in server control objects 324, user control objects 325, or as separate rules as part of view 311. The navigational flow included in navigational logic 334 is typically tested to ensure that the flow is consistent with a scenario associated with multiview object 300. The navigational flow may be a linear flow, a non-linear flow, a user-driven flow, an operational dependent flow, and the like. Navigational logic 334 may include instructions for moving to a previous view, a next view, or a specific view associated with multiview object 300. Navigational logic 334 may include instructions for moving to a particular view based on an input received through another view.

Operational logic 335 includes data and procedures for performing operations associated with view 311. Operational logic 335 may be implemented in server control objects 324 and user control objects 325. Operational logic 335 may also be implemented as separate operations as part of view 311. Operational logic 335 may be performed by the view rendering server that handles multiview object 300 or other servers that are in communication with the view rendering server. For example, an operation specified by operational logic 335 may be performed by a server that specializes to perform such operation. These operations may include emailing handling, user authentication, e-commerce, phone and paging services, and the like.

In addition to the above-identified objects and logic, view 311 may include other data 337 that is used to implement the view. The objects discussed above may be implemented as classes of objects. For example, multiview object 300 may be implemented as a container class that includes view object classes 311-313. A server may create instances of these objects for rendering views associated a multiview object that is declared in a source file.

Figure 4:
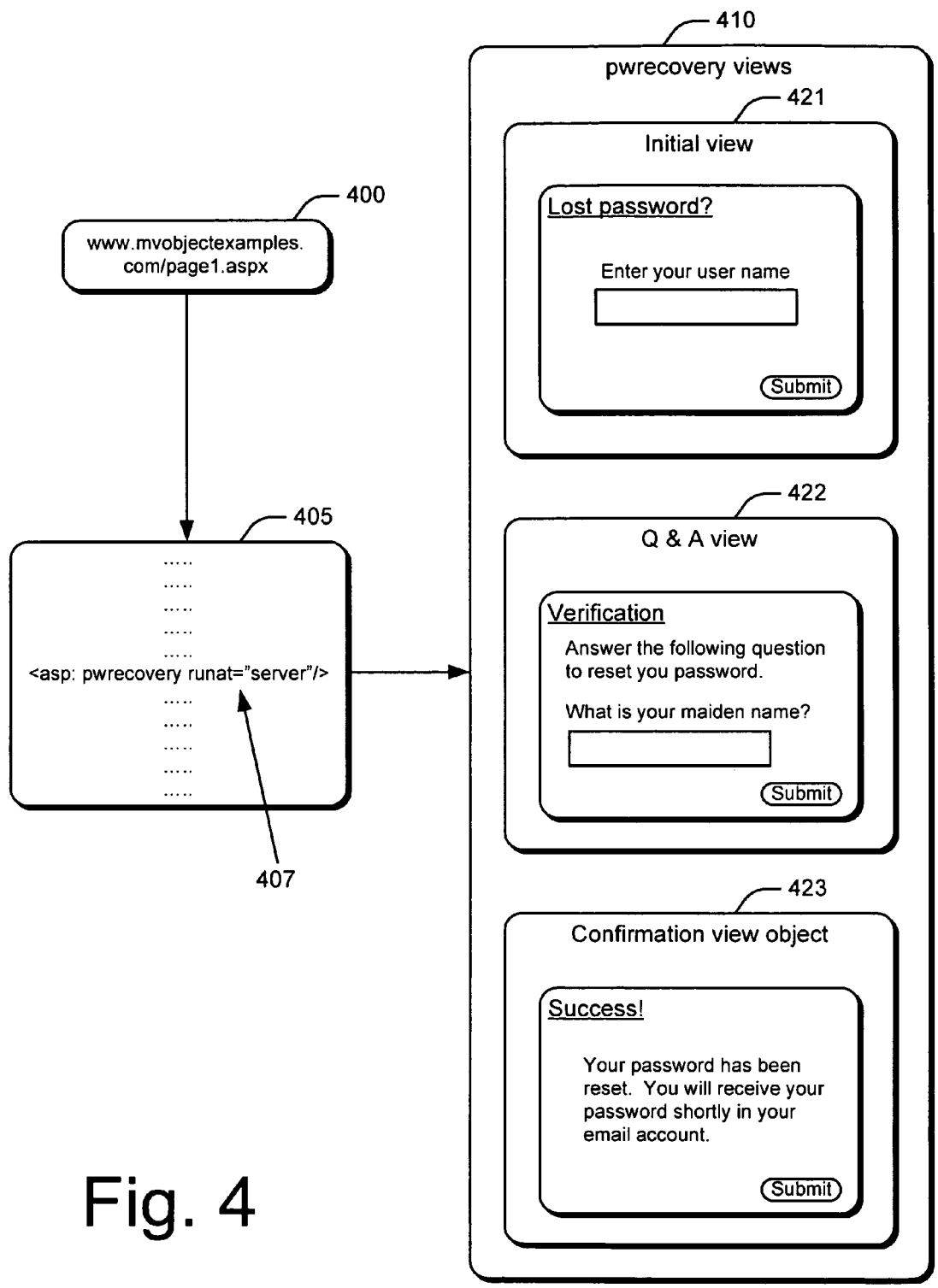
FIG. 4 is a graphical representation of an operational flow associated with a request for a web page.

FIG. 4 is a graphical representation of an operational flow associated with a request 400 for a web page. Request 400 may include an address associated with the requested web page. The address in request 400 is uniquely associated with a web page source file 405. As shown in FIG. 4, source file 405 includes a declaration 407 associated with a multiview server control, which is related to a password recovery scenario. Declaration 407 is included in source file 405 as a mark-up tag. A more detailed example of a multiview control declaration and related object classes will be discussed below.

Multiview server control "pwrecovery" is associated with views 410. These views enable a user to navigate through a password recovery scenario. Initial view 421 enables a user to supply a user name for which the password is to be recovered. The items in initial view 421 include text, a text box and a button. Initial view 421 also includes logic for submitting information to an account manager to identify the user with the input user name. Initial view 421 may include logic for navigating to different views based on input from the user and information from the account manager. For example, if the user name is valid, initial view 421 is configured to navigate to Q & A view 422.

Q & A view 422 includes information about a question received from the account manager to authenticate the user. Q & A view 422 is configured to receive the input from the user and to submit the input to the account manger. Q & A view 422 is also configured to navigate to confirmation view 423 if the answer submitted by the user is correct.

Confirmation view 423 is configured to inform the user that a password recovery scenario has been successfully completed. Confirmation view 423 may display information received from the account manager to the user. Confirmation view 423 may also be configured to interact with an email handler to send the recovered password to the user in an email.

Figure 5:
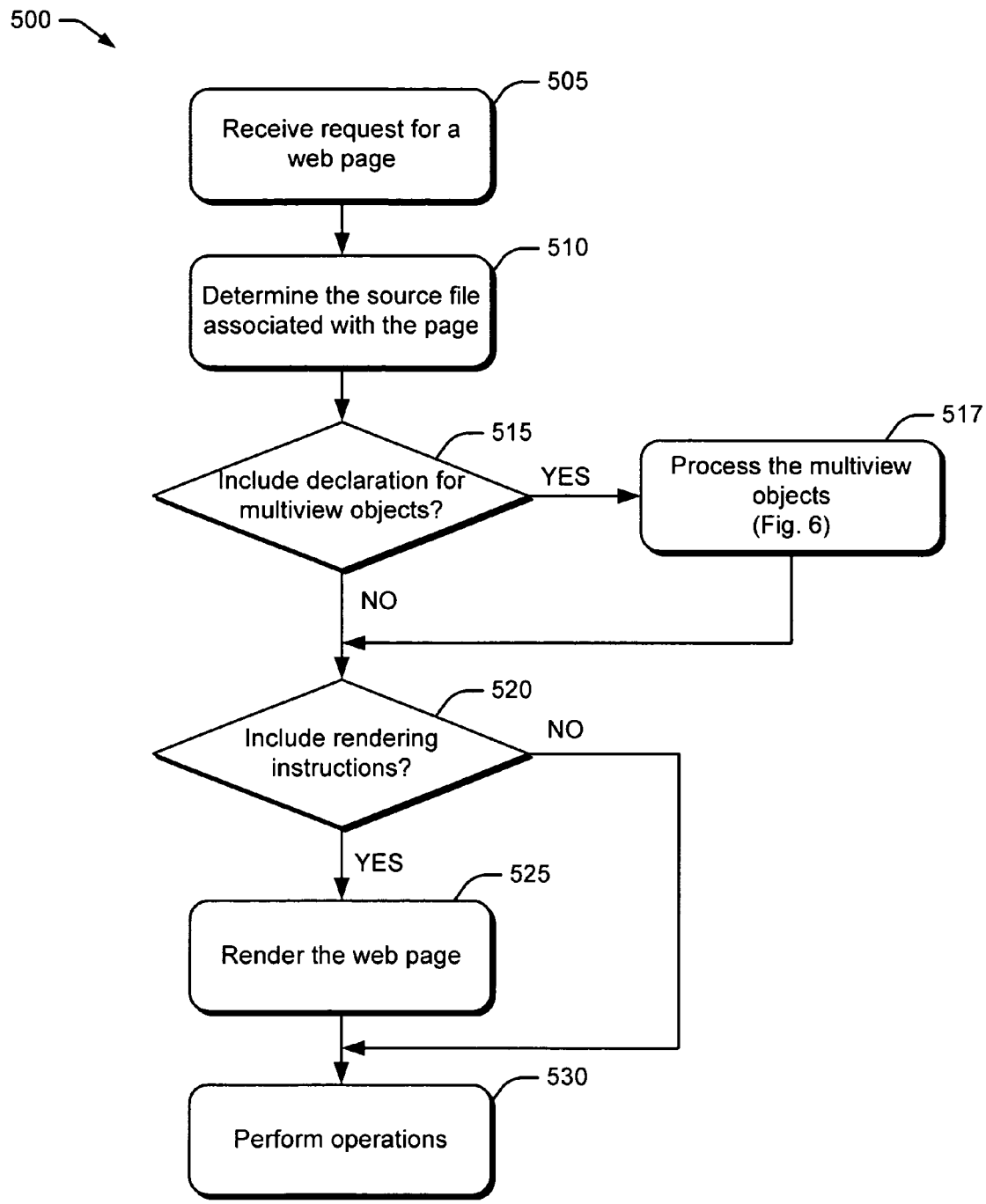
FIG. 5 is a flow diagram of an example process for a server to process a web page request from a client.

FIG. 5 is a flow diagram of an example process 500 for a server to process a web page request from a client. At block 505, a request for a web page is received. The request may include an address and other data associated with the web page. At block 510, a source file associated with the web page is determined.

At decision block 515, a determination is made whether the source file includes declarations for multiview objects. If so, process 500 moves to block 517 where the declared multiview objects are processed. The processing of multiview objects will be discussed in more detail in conjunction with FIG. 6. Briefly stated, views associated with the multiview objects are automatically rendered. Users may navigate through the rendered views to complete a scenario associated with the multiview object. It is to be understood that decision block 515 and block 517 are included to demonstrate the processing of multiview object declarations. The order in which objects in a source file are processed is typical specified by the code. After the multiview objects have been processed, process 500 moves to decision block 520.

Returning to decision block 515, if the source file does not include any multiview objects, process 500 also moves to decision block 520. At decision block 520, a determination is made whether the source file includes rendering instructions. The source file may include rendering instructions in hyper text markup language (HTML), scripts, object-oriented instructions, and the like. If the source file includes rendering instructions, process 500 moves to block 525 where the web page is rendered. The process then moves to block 530.

Returning to decision block 520, if the source file does not include rendering instructions, process 500 also moves to block 530. At block 530, operations included in the source file are performed. The source file may include any type of operation. The operations in the source file may be performed based on input received from a user.

Figure 6:
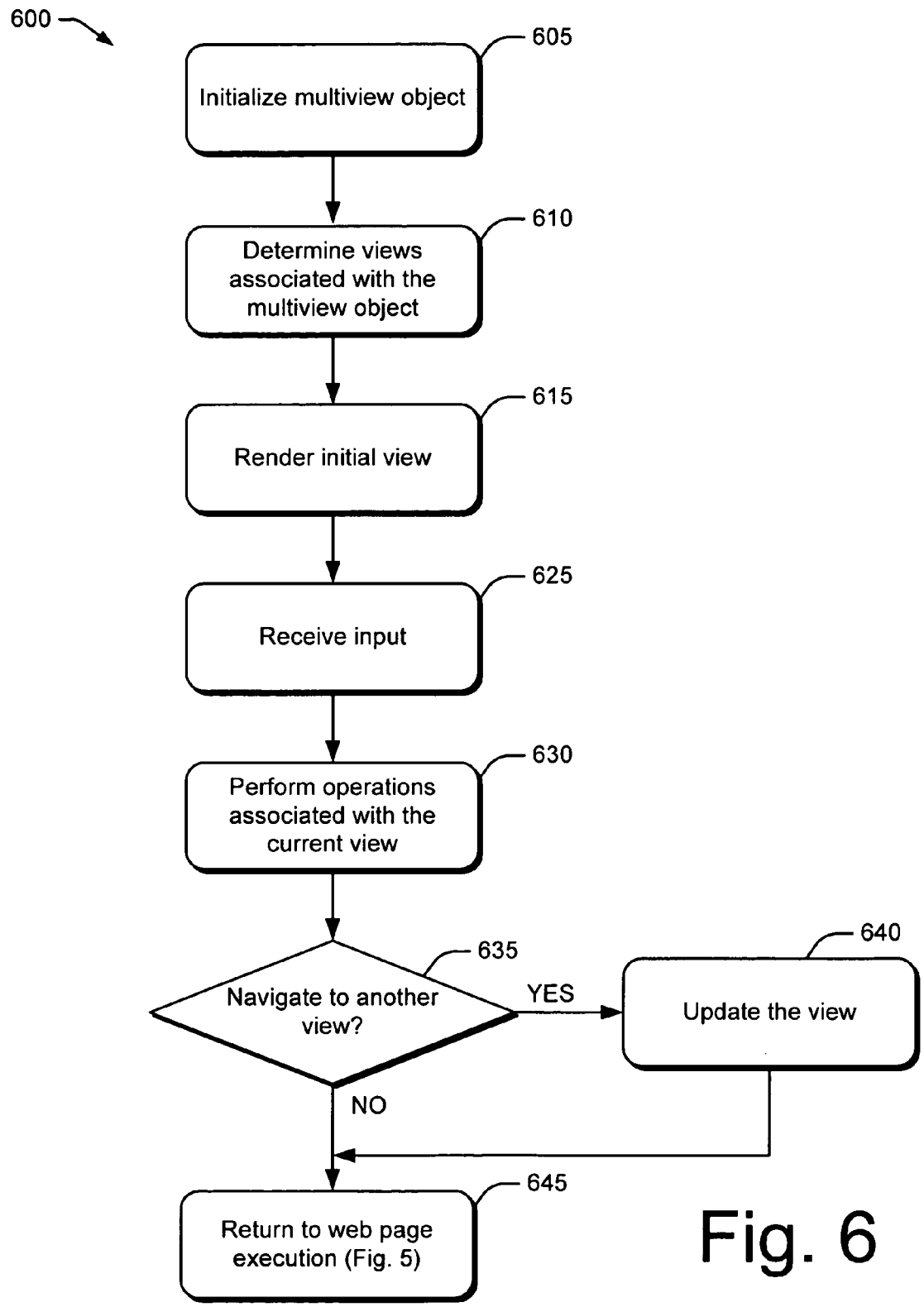
FIG. 6 is a flow diagram of an example process for a server to process a multiview object associated with a web page.

FIG. 6 is a flow diagram of an example process 600 for a server to process a multiview object associated with a web page. At block 605, the multiview object is initialized. For example, an instance of a multiview container object class may be created. Instances of other objects included in the multiview container object class may also be created. At block 610, the views associated with the multiview object are determined. At block 615, an initial view of the determined views is rendered. The view may be rendered using data and procedures included in the multiview object.

At block 625, an input associated with the currently rendered view is received. The input may be any type of data received from the view, such as input from the user, the client computer, and the like. At block 630, operations associated with the currently rendered view are performed. At block 635, a determination is made whether to navigate to another view. This determination may be made based on the navigational logic associated with the multiview object. It is to be understood that the navigational logic may include navigating back to the same view.

If the determination is made to navigate to another view, process 600 moves to block 640 where the current view is updated to the other view. The process then goes to block 645. If the determination is made to not navigate to another view, the process moves to block 645. At block 645, process 600 returns to the web page execution.

Figure 7:
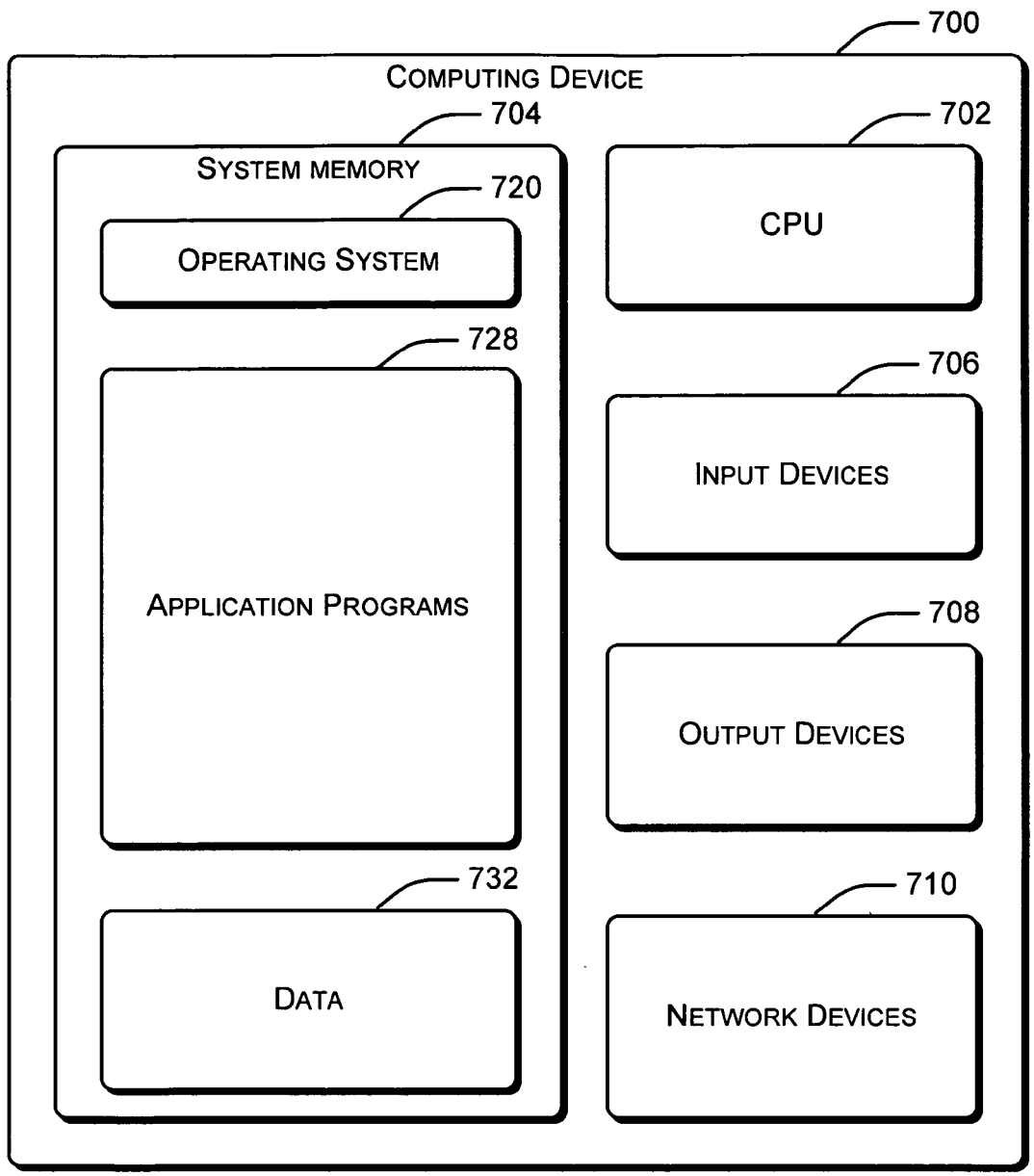
FIG. 7 illustrates an example computing device within which the described systems and methods can be either fully or partially implemented.

FIG. 7 illustrates an example computing device 700 within which the described systems and methods can be either fully or partially implemented. Computing device 700 is only one example of a computing system and is not intended to suggest any limitation as to the scope of the use or functionality of the invention.

Computing device 700 can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The components of computing device 700 can include, but are not limited to, processor 702 (e.g., any of microprocessors, controllers, and the like), system memory 704, input devices 706, output devices 708, and network devices 710.

Computing device 700 typically includes a variety of computer-readable media. Such media can be any available media that is accessible by computing device 700 and includes both volatile and non-volatile media, removable and non-removable media. System memory 704 includes computer-readable media in the form of volatile memory, such as random access memory (RAM), and/or non-volatile memory, such as read only memory (ROM). A basic input/output system (BIOS), containing the basic routines that help to transfer information between elements within computing device 700, such as during start-up, is stored in system memory 704. System memory 704 typically contains data and/or program modules that are immediately accessible to and/or presently operated on by processor 702.

System memory 704 can also include other removable/ non-removable, volatile/non-volatile computer storage media. By way of example, a hard disk drive may be included for reading from and writing to a non-removable, non-volatile magnetic media; a magnetic disk drive may be included for reading from and writing to a removable, non-volatile magnetic disk (e.g., a "floppy disk"); and an optical disk drive may be included for reading from and/or writing to a removable, non-volatile optical disk such as a CD-ROM, DVD, or any other type of optical media.

The disk drives and their associated computer-readable media provide non-volatile storage of computer-readable instructions, data structures, program modules, and other data for computing device 700. It is to be appreciated that other types of computer-readable media which can store data that is accessible by computing device 700, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement exemplary computing device 700. Any number of program modules can be stored in system memory 704, including by way of example, an operating system 720, application programs 728, and data 732.

Computing device 700 can include a variety of computer-readable media identified as communication media. Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into computing device 700 via input devices 706 such as a keyboard and a pointing device (e.g., a "mouse"). Other input devices 706 may include a microphone, joystick, game pad, controller, satellite dish, serial port, scanner, touch screen, touch pads, key pads, and/or the like. Output devices 708 may include a CRT monitor, LCD screen, speakers, printers, and the like.

Computing device 700 may include network devices 710 for connecting to computer networks, such as local area network (LAN), wide area network (WAN), and the like.

To further illustrate how the described systems and methods can be implemented, example codes are included below.

Table 1 includes an example declaration that may be included in a source file for a web page to declare a multiview object class named "PasswordRecovery". Table 2 illustrates the properties that are associated with the "PasswordRecovery" class.

TABLE 1

Example code for PasswordRecovery.

```
<asp:PasswordRecovery runat=server SubmitButtonText="GetPassword"
    SubmitButtonType=Link />
    <SubmitButtonStyle Backcolor=Orange/>
    <TitleTextStyle FontStyle=Bold/>
    <MailDefinition From="PasswordGuru@MySite.com"Subject="Your
New Password"
    BodyFileName="PasswordMail.txt"/>
</asp:PasswordRecovery>
```

TABLE 2

Class definition.

```
namespace System.Web.UI.WebControls.
{
    public class PasswordRecovery: CompositeControl,
INamingContainer
    {
    // Properties - Core functionality
        public String  MembershipProvider    { get; set; }
        public String  SuccessPageUrl        { get; set; }
```

TABLE 2-continued

Class definition.

```
        public String  UserNameLabelText     { get; set; }
        public String  AnswerLabelText       { get; set; }
        public String  QuestionLabelText     { get; set; }
        public String  SuccessText           { get; set; }
        public MailDefinition MailDefinition          { get; }
        public String  SubmitButtonText      { get; set; }
        public String  SubmitButtonImageUrl  { get; set; }
        public String  UserName{ get; set; }
        public String  Question { get; }
        public String  Answer { get; }
    //Properties - Optional functionality within the control
        public String  UserNameTitleText { get; set; }
        public String  UserNameInstructionText{ get; set; }
        public String  QuestionTitleText    { get; set; }
        public String  QuestionInstructionText   { get; set; }
        public String  HelpPageText { get; set; }
        public String  HelpPageUrl { get; set; }
    //Properties - Validation and Error Messages
        public String  EnableValidation       { get; set; }
        public String  UserNameFailureText{ get; set; }
        public String  QuestionFailureText { get; set; }
        public String  UserNameRequiredErrorMessage{ get; set; }
        public String  AnswerRequiredErrorMessage{ get; set; }
        public String  GeneralFailureText   { get; set; }
    //Properties - Display Styles and Information
        public LoginTextLayout TextLayout { get; set; }
        public ButtonType SubmitButtonType{ get; set; }
        public Style   SubmitButtonStyle    { get; }
        public Style   LabelStyle     { get; }
        public Style   TextBoxStyle { get; }
        public Style   HyperlinkStyle{ get; }
        public Style   InstructionTextStyle    { get; }
        public Style   TitleTextStyle         { get; }
        public Style   FailureTextStyle       { get; }
        public Style   SuccessTextStyle      {get; set; }
        public ITemplate   UserNameTemplate    { get; set; }
        public ITemplate   QuestionTemplate    { get; set; }
        public ITemplate   SuccessTemplate     { get; set; }
    // Events
        public CancelEventHandler VerifyingUser    { add; remove; }
        public EventHandler UserLookupError        { add; remove; }
        public CancelEventHandler VerifyingAnswer{ add; remove; }
        public EventHandler AnswerLookupError      { add; remove; }
        public MailMessageEventHandler SendingMail{ add; remove; }
    // Methods
        protected virtual void OnVerifyingUser (CancelEventArgs)
        protected virtual void OnUserLookupError  (EventArgs)
        protected virtual void OnVerifyingAnswer  (CancelEventArgs)
        protected virtual void OnAnswerLookupError (EventArgs)
        protected virtual void OnSendingMail (MailMessageEventArgs)
    }
}
```

Below is information about the properties that the "PasswordRecovery" class may include.

Property:       MembershipProvider
Prototype:      public String MembershipProvider { get; set; }
Description:    Determines the name of the Membership data provider to be used by the control. The default value of this property is emptystring at both design and runtime. If the property value is emptystring then the default provider specified in configuration will be used. If a developer sets the property value to emptystring or null it will continue to use the default provider as specified in configuration.
Default Value:  MembershipProvider=""
Property:       SuccessPageUrl
Prototype:      public String SuccessPageUrl { get; set; }
Description     Determines the page that the web site user will see after the password has been sent.
Default Value   SuccessPageUrl=string.empty
Property:       UserNameLabelText
Prototype:      public String UserNameLabelText { get; set; }
Description:    Label text for UserName textbox.
Default Value:  UserNameLabelText="UserName:"

Property: AnswerLabelText
Prototype: public String AnswerLabelText { get; set; }
Description: Label text for Answer textbox.
Default Value: AnswerLabelText="Answer:"
Property: QuestionLabelText
Prototype: public String QuestionLabelText { get; set; }
Description: Label text for Question textbox.
Default Value: QuestionLabelText="Question:"
Property: SuccessText
Prototype: public String SuccessText { get; set; }
Description: Text that is displayed if the developer has chose refresh as the success action and the user has been authorized to have their password sent to them. .
Default Value: SuccessText="You password has been sent to you."
Property: MailDefinition
Prototype: public MailDefinition MailDefinition { get; }
Description: Collection of properties that determines the content and format of the email message to be sent with the new password.
Default Value: MailDefinition=null
Property: SubmitButtonText
Prototype: public String SubmitButtonText { get; set; }
Description: Text that appears on the button that submits the form.
Default Value: SubmitButtonText="Submit"
Property: SubmitButtonImageUrl
Prototype: public String SubmitButtonImageUrl { get; set; }
Description: Provides the location for the image that will be used if an ImageButtonType is selected. .
Default Value: SubmitButtonImageUrl=string.empty
Property: UserName
Prototype: public String UserName { get; set; }
Description: Value or the UserName textbox.
Default Value: UserName=string.empty
Property: Question
Prototype: public String Question { get; }
Description: Value or the Question textbox.
Default Value: Question=string.empty
Property: Answer
Prototype: public String Answer { get; }
Description: Value or the Answer textbox.
Default Value: Answer=string.empty
Property: UserNameTitleText
Prototype: public String UserNameTitleText { get; set; }
Description: Title that is displayed in the initial view of the control when the user is entering their UserName for lookup.
Default Value: UserNameTitleText="Forgot Your Password?"
Property: UserNameInstructionText
Prototype: public String UserNameInstructionText { get; set; }
Description: Text that is displayed in the initial view of the control when the user is entering their UserName.
Default Value: UserNameInstructionText="Enter your User name to receive your password."
Property: QuestionTitleText
Prototype: public String QuestionTitleText { get; set; }
Description: Title that is displayed in the initial view of the control when the user is confirming their identity by answering a predetermined question.
Default Value: QuestionTitleText="Identity Confirmation"
Property: QuestionInstructionText
Prototype: public String QuestionInstructionText { get; set; }
Description: Text that is displayed in the initial view of the control when the user is answering a question to confirm their identity.
Default Value: QuestionInstructionText="Answer the following question to receive your password."
Property: HelpPageText
Prototype public String HelpPageText { get; set; }
Description: Text that is displayed as a link to the password help page. If set this link will be rendered on the UserName lookup view and on the Question confirmation view. The Help link will not be displayed on the confirmation view. If both the text and URL are not set then the link will not be rendered.
Default Value: HelpPageText=string.empty
Property: HelpPageUrl
Prototype: public String HelpPageUrl { get; set; }
Description: Provides the Url for the password for the HelpPageText. Both the text and URL are required for them to be displayed on the lookup and question view.
Default Value: HelpPageUrl=string.empty
Property: EnableValidation
Prototype: public Bool EnableValidation { get; set; }
Description: Turns off required field validators on the Login control.
Default Value: EnableValidation=True
Property: UserNameFailureText
Prototype: public String UserNameFailureText { get; set; }
Description: Determines the text that is displayed if the User name lookup fails.
Default Value: UserNameFailureText="We were unable to access your information. Please try again."
Property: QuestionFailureText
Prototype: public String QuestionFailureText { get; set; }
Description: Determines the text that is displayed if the answer provided fails the check.
Default Value: QuestionFailureText="Your answer could not be verified. Please try again."
Property: UserNameRequiredErrorMessage
Prototype: public String UserName1RequiredErrorMessage{get;set;}
Description: The text that is displayed in the validation summary when the User name field is blank.
Default Value: UserName1RequiredErrorMessage="User name."
Property: AnswerRequiredErrorMessage
Prototype: public String AnswerRequiredErrorMessage{ get; set; }
Description: The text that is displayed in the validation summary when the Answer fields are blank.
Default Value: AnswerRequiredErrorMessage="Answer."
Property: GeneralFailureText
Prototype: public String GeneralFailureText { get; set; }
Description: Generic text that is displayed when the user information does not match and the password will not be sent by email. It uses the FailureTextStyle for formatting.
Default Value: PasswordRecoveryFailureText="Your attempt to retrieve your password has failed. Please try again."
Property: TextLayout
Prototype: public LoginTextLayout TextLayout { get; set; }
Description: Specifies the text layout for the PasswordRecovery control from a list of available options.
Default Value: TextLayout=TextOnLeft
Property: SubmitButtonType
Prototype: public ButtonType SubmitButtonType { get; set; }
Description: Specifies the type of button to be used.
Default Value: SubmitButtonType=Button
Property: SubmitButtonStyle
Prototype: public Style SubmitButtonStyle { get; }
Description: The style settings to be used for the submit button.
Default Value: SubmitButtonStyle=null
Property: LabelStyle
Prototype: public Style LabelStyle { get; }
Description: The style settings to be used for the UserName and Password labels.
Default Value: LabelStyle=null
Property: TextBoxStyle
Prototype: public Style TextBoxStyle { get; }
Description: The style settings to be used for the User name and Password textboxes.
Default Value: TextBoxStyle=null
Property: HyperlinkStyle
Prototype: public Style HyperlinkStyle { get; }
Description: The style settings to be used for all of the hyperlinks (new user, password reminder) in the control.
Default Value: HyperlinkStyle=null
Property: InstructionTextStyle
Prototype: public Style InstructionTextStyle { get; }
Description: The style settings to be used for the Instruction Text.
Default Value: InstructionTextStyle=null
Property: TitleTextStyle
Prototype: public Style TitleTextStyle { get; }
Description: The style settings to be used for the Title Text.
Default Value: TitleTextStyle=null
Property: FailureTextStyle
Prototype: public StyleFailureTextStyle { get; }
Description: The style settings to be used for all of the error messages (e.g. membership api errors, required fields and regular expression validators).
Default Value: FailureTextStyle=null
Property: SuccessTextStyle
Prototype: public Style SuccessTextStyle { get; }
Description: The style settings to be used for the success message.
Default Value: SuccessTextStyle=null

| Property: | UserNameTemplate |
|---|---|
| Prototype: | public ITemplate UserNameTemplate { get; set; } |
| Description: | Determines the template to be used when customizing the layout and user interface for the UserName view of this control. |
| Default Value: | UserNameTemplate=null |
| Property: | QuestionTemplate |
| Prototype: | public ITemplate QuestionTemplate { get; set; } |
| Description: | Determines the template to be used when customizing the layout and user interface for the Question view of this control. |
| Default Value: | QuestionTemplate=null |
| Property: | SuccessTemplate |
| Prototype: | public ITemplate SuccessTemplate { get; set; } |
| Description: | Determines the template to be used when customizing the layout and user interface for the Success view of this control. |
| Default Value: | SuccessTemplate=null |

Below is information about the events that the "PasswordRecovery" class may include.

| Event: | VerifyingUser |
|---|---|
| Prototype: | public CancelEventHandler VerifyingUser {add; remove;} |
| Description: | Raised on the server after the user has submitted their information to the server but before the user information is sent to the membership api for confirmation. |
| Event: | UserLookupError |
| Prototype: | public EventHandler UserLookupError {add; remove;} |
| Description: | Raised on the server when the information provided by the user has failed to be confirmed via the membership api. |
| Event: | VerifyingAnswer |
| Prototype: | public CancelEventHandler VerifyingAnswer {add; remove;} |
| Description: | Raised on the server after the user has submitted their information to the server but before the confirmation answer is sent to the membership api for confirmation. |
| Event: | AnswerLookupError |
| Prototype: | public EventHandler AnswerLookupError {add; remove;} |
| Description: | Raised on the server when the confirmation answer provided by the user has failed to be confirmed via the membership api. |
| Event: | SendingMail |
| Prototype: | public MailMessageEventHandler SendingMail {add; remove;} |
| Description: | Raised on the server after the user has been successfully lookedup or confirmed but before the mail message has been sent. |

Below is information about the methods that the "PasswordRecovery" class may include.

| Method: | OnVerifyingUser |
|---|---|
| Prototype: | protected virtual void OnVerifyingUser(CancelEventArgs e) |
| Description: | Called when the user has clicked the submit button on the UserName lookup screen. The default implementation raises the event. |
| Method: | OnUserLookupError |
| Prototype: | protected virtual void OnUserLookupError (EventArgs e) |
| Description: | Called when the submitted user information fails to be validated. The default implementation raises the event. |
| Method: | OnVerifyingAnswer |
| Prototype: | protected virtual void OnVerifyingAnswer(CancelEventArgs e) |
| Description: | Called when the user has clicked the submit button on the confirmation answer lookup screen. The default implementation raises the event. |
| Method: | OnAnswerLookupError |
| Prototype: | protected virtual void OnAnswerLookupError (EventArgs e) |
| Description: | Called when the submitted user information fails to be validated. The default implementation raises the event. |
| Method: | OnSendingMail |
| Prototype: | protected virtual void OnSendingMail (MailMessageEventArgs e) |
| Description: | Called after the user's information has been validated and the send password process has been kicked off. The default implementation raises the event. |

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of defining web content navigation without using server-side navigational logic, the method comprising:
identifying a declaration in a source file for a web page, the declaration associated with a multiview object contained in the source file for the web page;
initializing the multiview object, wherein the multiview object is defined by an object class definition that defines properties, events, and methods of the multiview object and the multiview object is configured to enable a server to generate multiple views associated with a scenario;
determining the multiple views associated with the multiview object, each of the multiple views including a user-interface that corresponds to specific operations associated with each of the multiple views of the scenario, wherein each of the multiple views have different user-interfaces with different controls, and wherein at least one of the multiple views includes a control that performs a different action than a second control in another one of the multiple views;
determining a flow for navigating through the multiple views;
rendering each of the multiple views in accordance with the determined flow, wherein the flow is determined by navigation logic contained in the multiview object; and
returning to the execution of the web page upon reaching the end of navigation logic contained in the object.

2. The method as recited in claim 1, wherein the declaration includes a tag in the source file.

3. The method as recited in claim 2, wherein the tag includes a reference to the object and properties associated with the object.

4. The method as recited in claim 1, wherein each view includes at least one of a user control, a server control, text, multimedia items, navigational logic, operational logic, or a layout of the user interface.

5. The method as recited in claim 1, wherein the operational logic includes an operation that interacts with at least one of a email handler, an account manager, or a e-commerce handler.

6. The method as recited in claim 1, wherein the navigational logic includes moving to at least one of a previous view, a next view, or a specific view.

7. The method as recited in claim 1, wherein the navigational logic includes moving to a particular view based, at least in part, on an input received through another view.

8. The method as recited in claim 1, wherein the flow is implemented as navigational logic included in the multiple views.

9. The method as recited in claim 1, wherein the flow includes at least one of a liner flow, a non-linear flow, a user-driven flow, or an operational dependent flow.

10. The method as recited in claim 1, wherein rendering the multiple views includes displaying one of the views at a time based on the flow.

11. The method as recited in claim 1, wherein the scenario includes at least one of a login scenario, a logout scenario, a password recovery scenario, an e-commerce scenario, a change password scenario, a create user scenario, or a wizard scenario.

12. The method as recited in claim 1, wherein rendering the multiple views include:
   determining a current view;
   receiving input associated with the current view;
   determining a next view based, in part, on the input and the navigational logic associated with the current view; and
   rendering the next view.

13. A system comprising a server configured to:
   receive a request for a web page and to determine a source file associated with the requested web page, the source file including a declaration for a multiview object, wherein the multiview object is defined by an object class definition that defines properties, events, and methods of the multiview object;
   use the multiview object to generate multiple views associated with a scenario, wherein each of the multiple views includes a user-interface corresponding to specific operations associated with each of the multiple views of the scenario and navigational logic, the multiple views having different user-interfaces with different controls, wherein at least one of the multiple views includes a control that performs a different action than a second control in another one of the multiple views;
   render the multiple views based, at least in part, on the navigational logic included in the multiple views associated with the multiview object, wherein execution of the web page is resumed after completing the navigation of the multiview object.

14. The system as recited in claim 13, further comprising a data store, wherein the data store contains data associated with the multiview object for generating the multiple views.

15. The system as recited in claim 13, wherein the server is configured to perform the specific operations associated with at least one of the views.

16. The system as recited in claim 15, wherein the specific operations include at least one of sending an email, authenticate a user, sending an email, changing a password, setting up a user account, handling a business transaction, or making a phone call or a page.

17. The system as recited in claim 15, wherein the server is configured to perform the specific operations by interacting with a component that includes at least one of an email handler, an account manager, an e-commerce manager, or communication handler.

18. The system as recited in claim 17, wherein the component is implemented on another computing device coupled to the server through a network.

19. The system as recited in claim 13, further comprising a client configured to enable a user to browse to the web page and to send the request for the web page to the server, the client further configured to display the views rendered by the server to the user.

20. The system as recited in claim 19, wherein the client is further configured to enable the user to submit input associated with a particular view and to send the input to the server.

21. One or more computer readable storage media encoded with a data structure representing a source file associated with a web page, the data structure comprising:
   a first data field for storing a declaration for a multiview object, wherein the multiview object is defined by an object class definition that defines properties, events, and methods of the multiview object; when the declaration is identified by a server, the server generates multiple views associated with a scenario, wherein each of the multiple views includes a user-interface that corresponds to specific operations associated with each of the multiple views of the scenario and navigational logic for navigating between the multiple views, each of the multiple views having different user-interfaces with different controls, wherein at least one of the multiple views includes a control that performs a different action than second control in another one of the multiple views, and wherein flow between the multiple views is directed by the navigation logic associated with the multiview object.

22. The one or more computer-storage media as recited in claim 21, wherein the declaration includes a tag that specifies the multiview object.

23. The one or more computer-storage media as recited in claim 21, wherein the declaration includes data associated with the multiview object, and wherein the data includes at least one of properties, states, or options.

24. The one or more computer-storage media as recited in claim 21, wherein the source file causes the rendering of the views without defining the controls included in the views.

25. The one or more computer-storage media as recited in claim 21, wherein the source file causes the rendering of the multiple views without defining the navigational flow of the views.

26. A system comprising:
   a processor; and
   one or more computer storage media comprising computer program instructions that when executed by the processor cause the processor to:
   implement a scenario in a web application by including a declaration for an object in a source file associated with the web application, wherein the object is a multiview object that is defined by an object class definition that defines properties, events, and methods of the multiview object and the multiview object is configured to enable generation multiple views associated with a scenario, wherein each of the multiple views has an associated user-interface that corresponds to specific operations associated with each of the multiple views of the scenario;
   render the multiple views associated with the object wherein each of the multiple views have different user-interfaces with different controls, wherein at least one of the multiple views includes a control that performs a different action than a second control in another one of the multiple views; and
   navigate through the multiple views using navigational logic stored in the multiview object.

27. The system of claim 26, wherein the one or more computer storage media further comprise computer program instructions that when executed by the processor cause the processor to implement the multiple views associated with the scenario without defining controls in the views.

28. The system of claim 26, wherein the one or more computer storage media further comprise computer program instructions that when executed by the processor cause the processor to:
- determine a current view;
- receive input in the current view;
- determine a next view based, in part, on the input and the navigational logic associated with the current view; and
- render the next view.

29. The system of claim 26, wherein the one or more computer storage media further comprise computer program instructions that when executed by the processor cause the processor to include a declaration as a tag.

30. The system of claim 26, wherein the one or more computer storage media further comprise computer program instructions that when executed by the processor cause the processor to specify a property of the object.

31. One or more computer storage media storing computer executable instructions that when executed by a processor perform a method of defining web content navigation without using server-side navigational logic, the method comprising:
- identifying a declaration in a source file for a web page, the declaration associated with a multiview object contained in the source file for the web page;
- initializing the multiview object, wherein the multiview object is defined by an object class definition that defines properties, events, and methods of the multiview object and the multiview object is configured to enable a server to generate multiple views associated with a scenario;
- determining the multiple views associated with the multiview object, each of the multiple views including a user-interface that corresponds to specific operations associated with each of the multiple views of the scenario, wherein each of the multiple views have different user-interfaces with different controls, and wherein at least one of the multiple views includes a control that performs a different action than a second control in another one of the multiple views;
- determining a flow for navigating through the multiple views;
- rendering each of the multiple views in accordance with the determined flow, wherein the flow is determined by navigation logic contained in the multiview object; and
- returning to the execution of the web page upon reaching the end of navigation logic contained in the object.

32. The computer storage media as recited in claim 1, wherein the declaration includes a tag in the source file.

33. The computer storage media as recited in claim 2, wherein the tag includes a reference to the object and properties associated with the object.

34. The computer storage media as recited in claim 1, wherein each view includes at least one of a user control, a server control, text, multimedia items, navigational logic, operational logic, or a layout of the user interface.

35. The computer storage media as recited in claim 1, wherein the operational logic includes an operation that interacts with at least one of a email handler, an account manager, or a e-commerce handler.

* * * * *